United States Patent
Huijs

(10) Patent No.: US 10,272,505 B2
(45) Date of Patent: Apr. 30, 2019

(54) STACKED MATERIAL TOOL AND METHOD FOR MACHINING

(71) Applicant: SECO TOOLS AB, Fagersta (SE)

(72) Inventor: Jeroen Huijs, Grubbenvorst (NL)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 15/119,823

(22) PCT Filed: Feb. 2, 2015

(86) PCT No.: PCT/EP2015/052087
§ 371 (c)(1),
(2) Date: Aug. 18, 2016

(87) PCT Pub. No.: WO2015/128156
PCT Pub. Date: Sep. 3, 2015

(65) Prior Publication Data
US 2017/0056985 A1 Mar. 2, 2017

(30) Foreign Application Priority Data
Feb. 25, 2014 (EP) .................................... 14156528

(51) Int. Cl.
*B23C 5/10* (2006.01)

(52) U.S. Cl.
CPC ........ *B23C 5/10* (2013.01); *B23C 2210/0414* (2013.01); *B23C 2210/0428* (2013.01);
(Continued)

(58) Field of Classification Search
CPC ........ B23C 2210/0485; B23C 2210/44; B23C 2226/27; B23C 2210/0414; B23C 2210/0428; B23C 2210/0492
See application file for complete search history.

(56) References Cited

U.S. PATENT DOCUMENTS 4,174,915 A * 11/1979 Peetz ........................ B23C 5/10
407/59
4,480,949 A 11/1984 Van De Bogart
(Continued)

FOREIGN PATENT DOCUMENTS

DE 10318948 A 8/2004
DE 102006022572 A1 11/2007
(Continued)

OTHER PUBLICATIONS

English translation of JP-02-180516, Jul. 1990.*

*Primary Examiner* — Alan Snyder
(74) *Attorney, Agent, or Firm* — Corinne R. Gorski

(57) ABSTRACT

A tool for machining a stacked material workpiece includes a tool body having one or more helical flutes extending to a forward end of the tool body. Each helical flute has a width defined by a first cutting edge and a second edge, a surface of the flute adjacent the first cutting edge facing the forward end of the tool body and a surface of the flute adjacent the second edge facing away from the forward end of the tool body. Each helical flute can include a first portion having a first negative pitch angle and a second portion having a second negative pitch angle different from the first negative pitch angle, the first portion extending from the forward end of the tool body to the second portion. The tool has only negative pitch angles. A method for machining a stacked material is also disclosed.

14 Claims, 3 Drawing Sheets

(52) U.S. Cl.
CPC ............. *B23C 2210/0457* (2013.01); *B23C 2210/0492* (2013.01); *B23C 2210/086* (2013.01); *B23C 2210/203* (2013.01); *B23C 2210/40* (2013.01); *B23C 2210/486* (2013.01); *B23C 2215/04* (2013.01); *B23C 2222/04* (2013.01); *B23C 2222/88* (2013.01); *B23C 2226/27* (2013.01); *B23C 2230/04* (2013.01)

(56) References Cited

U.S. PATENT DOCUMENTS

| | | | |
|---|---|---|---|
| 5,323,823 A | 6/1994 | Kopras | |
| 2003/0118411 A1* | 6/2003 | Flynn | B23C 5/10 407/53 |
| 2007/0297864 A1 | 12/2007 | De Boer | |
| 2010/0006181 A1 | 1/2010 | Fischer et al. | |
| 2013/0294852 A1 | 11/2013 | Winebrenner | |

FOREIGN PATENT DOCUMENTS

| | | | | |
|---|---|---|---|---|
| DE | 202011001512 U1 | 3/2011 | | |
| DE | 102011105674 A1 | 12/2011 | | |
| DE | 102012009038 A1 | 11/2013 | | |
| FR | 2897547 A | 8/2007 | | |
| JP | S49059370 A | 6/1974 | | |
| JP | S59175915 A | 10/1984 | | |
| JP | 63105814 A * | 5/1988 | ............. | B23C 5/003 |
| JP | 02180516 A * | 7/1990 | ............. | B23C 5/10 |
| JP | H02180516 A | 7/1990 | | |
| JP | 2724120 B | 9/1994 | | |
| JP | H06246525 A | 9/1994 | | |
| JP | H1080815 A | 3/1998 | | |
| JP | 2000210808 A | 8/2000 | | |
| SU | 946815 A1 | 7/1982 | | |
| SU | 1726165 A1 | 4/1992 | | |

* cited by examiner

STACKED MATERIAL TOOL AND METHOD FOR MACHINING

RELATED APPLICATION DATA

This application is a § 371 National Stage Application of PCT International Application No. PCT/EP2015/052087 filed Feb. 2, 2015 claiming priority of EP Application No. 14156528.3, filed Feb. 25, 2014.

BACKGROUND

The present invention relates to tools and methods for machining and, more particularly, to tools and methods for machining stacked materials having different characteristics.

In the aerospace industry, stacked materials are very common. Materials of particular interest in this industry are materials made of stacked fiber reinforced polymer (FRP)-Ti, FRP-Al, and FRP-Stainless Steel. FRP can be a carbon fiber reinforced polymer (CFRP) or a glass fiber reinforced polymer (GFRP). It is difficult to machine stacked materials when the two materials are best machined by different types of cutting edges. It has generally been necessary to choose between a tool designed for CFRP or a tool designed for, for instance, Titanium. This results in a shorter tool life and poor surface finishes on the workpiece.

Another problem that occurs when machining stacked materials is that sharp chips from a material, such as Titanium, cause scratches on the more delicate material, such as CFRP and GFRP, when being extracted out of the flute of the tool.

DE 20 2011 001512 U1 and JP H06 246525 A each shows a tool that comprises positive and negative pitch angles.

It is desirable to provide a tool and method for machining a stacked material that can provide optimal machining characteristics for the respective materials of the stacked material. It is also desirable to provide a tool and method that reduces the potential for damage to the more delicate material.

SUMMARY

According to an aspect of the present invention, a stacked material workpiece tool comprises a tool body comprising one or more helical flutes extending to a forward end of the tool body. Each helical flute has a width defined by a first cutting edge and a second edge, a surface of the flute adjacent the first cutting edge facing the forward end of the tool body and a surface of the flute adjacent the second edge facing away from the forward end of the tool body, and each helical flute comprises a first portion having a first negative pitch angle and a second portion having a second negative pitch angle different from the first negative pitch angle, the first portion extending from the forward end of the tool body to the second portion, wherein the first negative pitch angle is greater than the second negative pitch angle, and wherein the first negative pitch angle is chosen in the range of 35 to 45°, preferably about 40° and the second negative pitch angle is chosen in the range of 5 to 15°, preferably about 10°.

The tool facilitates removal of material from a workpiece in a direction toward the forward end of the tool body, which can facilitate avoiding damage to one material of the stacked material adjacent the second portion of the helical flute that might result from sharp chips formed from a material adjacent the first portion. In addition, machining characteristics of the first portion and the second portion can be optimized for the particular material of the stacked material that they will be machining.

According to another aspect of the present invention, a method for machining a stacked material workpiece is provided, the workpiece comprising a first material stacked adjacent a second material, such as of FRP, that is more delicate than the first material. The method includes forming a hole in the workpiece, positioning a tool in accordance with any of claims 1-8 for machining the workpiece in the hole, the tool comprising a tool body comprising one or more helical flutes extending to a forward end of the tool body, each helical flute comprising a first portion having a first negative pitch angle and a second portion having a second negative pitch angle different from the first negative pitch angle, the first portion being disposed adjacent the first material and the second portion being disposed adjacent the second material, removing material from the workpiece by turning the tool about a longitudinal axis of the tool in a machining direction to form chips from the first material and the second material, and removing chips from the hole via the one or more flutes in a direction toward the first material and away from the second material.

The method facilitates removal of material from a workpiece in a direction that tends to avoid damage to a more delicate material of the stacked material adjacent the second portion of the helical flute. In addition, machining characteristics of the first portion and the second portion can be optimized for the particular material of the stacked material that they will be machining.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
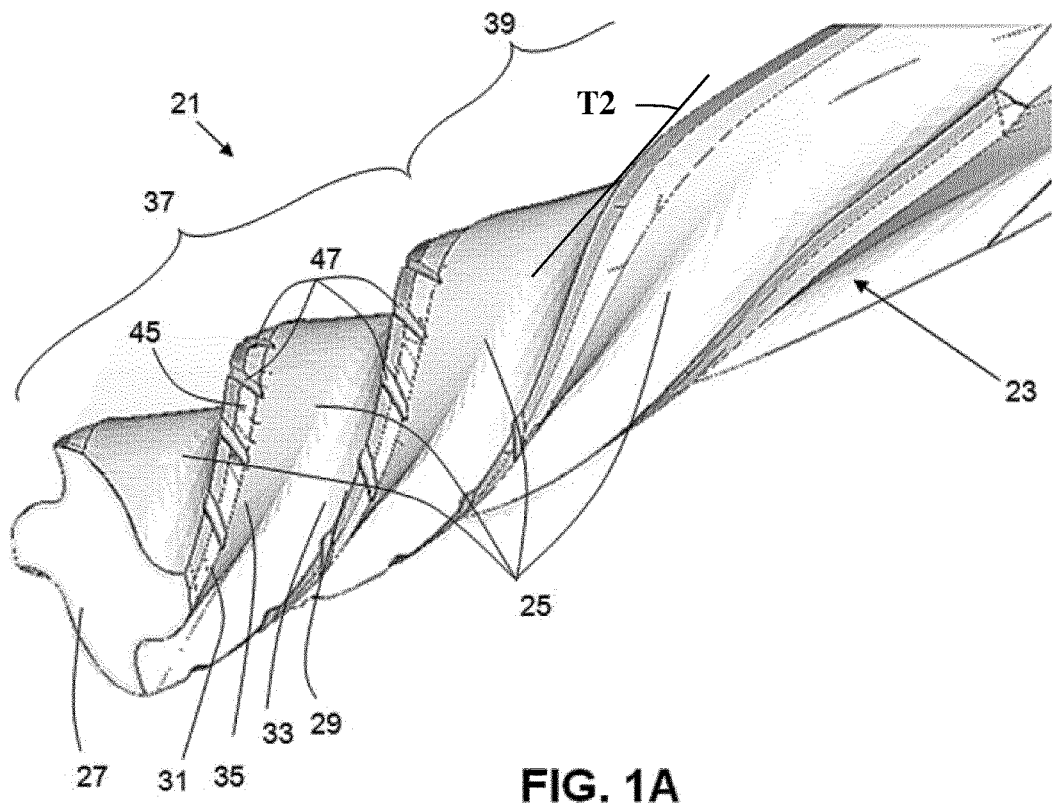
FIG. 1A is a perspective view of a portion of a tool according to an aspect of the present invention.
Figure 1B:
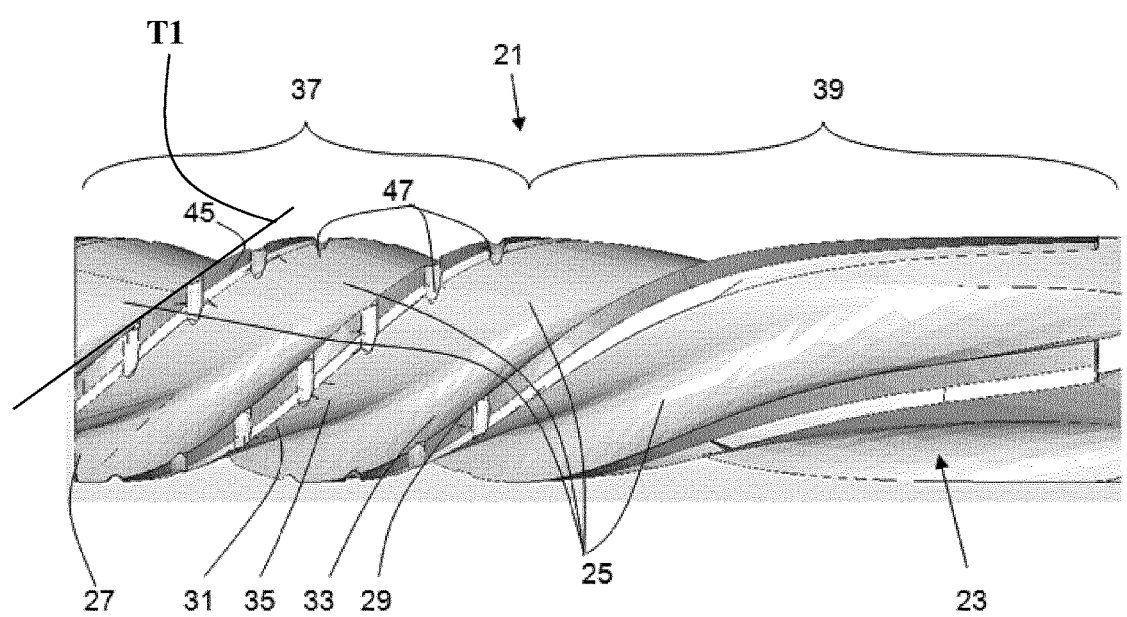
FIG. 1B is a side view of the portion of the tool of FIG. 1A.
Figure 2A:
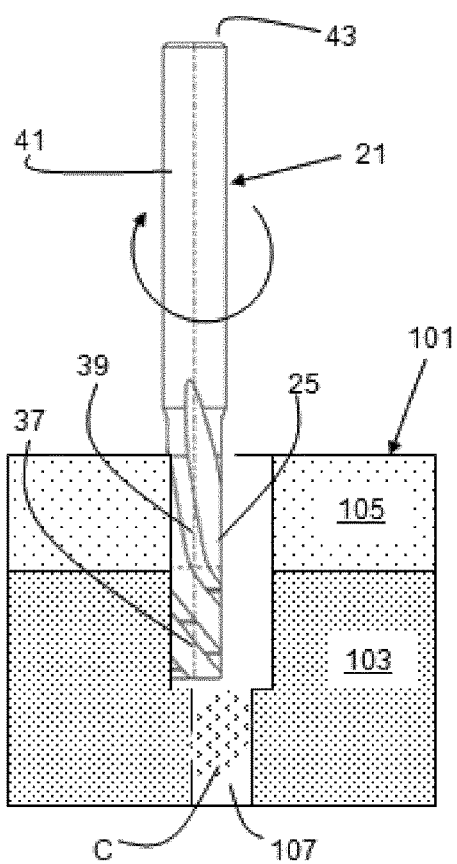
FIGS. 2A and 2B are partially cross-sectional views of workpieces machined by tools according to aspects of the present invention.

FIGS. 1A-1B show a portion of a tool 21 for machining a stacked material workpiece 101 (see FIG. 2A). The stacked material workpiece 101 includes a first material 103 of metal having a first thickness and a second material 105 of FRP which is assumed to have a mechanical properties different from the metal and a second thickness that may be greater than, less than, or equal to the first thickness. The first material 103 and the second material 105 may be any stackable materials. Materials of particular interest are Carbon or Glass fiber reinforced polymer (CFRP or GFRP)-Ti, (CFRP or GFRP)-Al, and (CFRP or GFRP)-Stainless Steel.

The tool 21 comprises a tool body 23 comprising one or more helical flutes 25 extending to a forward end 27 of the tool body. As seen, for example, in FIG. 3B, the illustrated tool 21 has four flutes 25. The forward end 27 of the tool body 23 can be perpendicular to the longitudinal axis of the tool 21 as illustrated, however, it might alternatively define, when rotated, a conical or other profile. Each helical flute 25 has a width defined by a first cutting edge 29 and a second edge 31. The forward end 27 maybe non-cutting, such as by being completely planar, or cutting, such as by being provided with radially extending cutting edges (for the operation shown in FIG. 2A). Preferably, the first cutting edge 29 has a positive rake angle.

In embodiments of the tool 21 where it is desired to machine a stacked material wherein the first material 103 will produce sharper chips than the second material 105, and the forward end 27 of the tool body 23 is disposed in a hole 107 in the first material (FIG. 2A) or extends through the hole outside of the workpiece 101 on an opposite side of the first material from the second material (FIG. 2B), a first surface or rake face 33 of the flute 25 adjacent the first cutting edge 29 faces the forward end 27 of the tool body and a second surface 35 of the flute adjacent the second edge 31 faces away from the forward end of the tool body. By providing flutes 25 having such a configuration, rotation of the tool 21 in a cutting or machining direction, i.e., in a direction in which the cutting edge 29 performs a cutting or machining operation, chips C machined by the tool from the workpiece 101 will tend to flow toward the forward end 27 of the tool body. In this way, the sharp chips of the first material 103 will be removed from the machine hole 107 in a direction to avoid damage the more delicate second material 105 as they flow out of the hole. In the embodiments of the tool 21 shown in FIGS. 1A-3B, the tool is adapted to perform a machining operation when rotated in a clockwise direction about a longitudinal axis of the tool and the helical flute 25 is "left-handed".

Each helical flute 25 comprises a first portion 37 having a first negative pitch angle and a second portion 39 having a second negative pitch angle different from the first negative pitch angle, the first portion extending from the forward end 27 of the tool body 23 to the second portion. The geometry of the flute 25 changes in helix, rake and cutting edge type according to the most optimal geometry for the material 103 and 105 positioned on that height of the tool. The first portion 37 of the flute 25 will ordinarily be disposed in the hole 107 adjacent the first material 103 and the second portion 39 of the flute will ordinarily be disposed in the hole adjacent the second material 105. For machining of the workpiece shown in FIGS. 2A and 2B wherein the first material 103 has different mechanical properties compared to the second material 105, the first negative pitch angle will ordinarily (but not necessarily) be greater than the second negative pitch angle, i.e., the second negative pitch angle will be less than the first negative pitch angle. The negative pitch angle of the first portion 37 may be chosen in the range of 35 to 45°, preferably about 40° and the negative pitch angle of the second portion 39 may be chosen in the range of 5 to 15°, preferably about 10°, relative to a longitudinal axis of the tool.

Figure 2B:
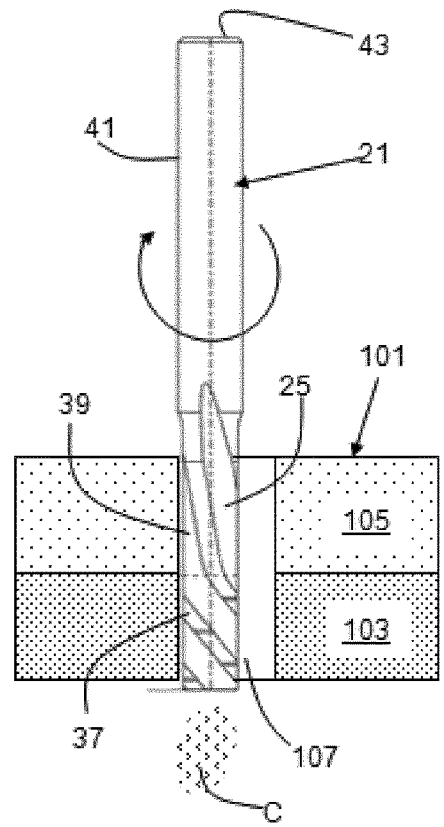
Figure 3A:
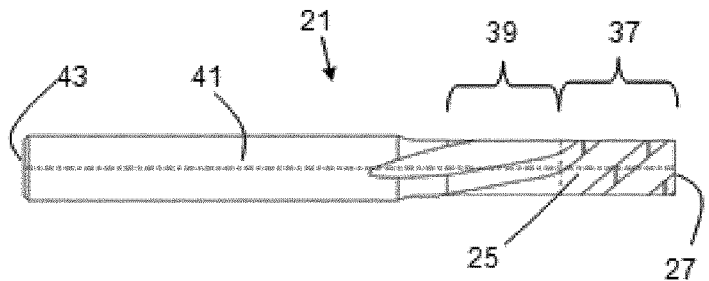
FIG. 3A is a side view of a tool according to an aspect of the present invention and FIG. 3B is an end view of the tool of FIG. 3A.
Figure 3B:
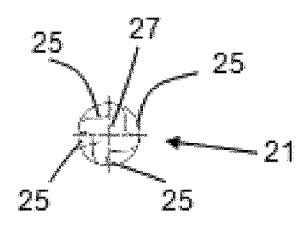

As seen in FIGS. 2A-2B and 3A, an unthreaded shank portion 41 is ordinarily provided at an end 43 of the tool body 23 opposite the forward end 27.

As seen in FIGS. 1A-1B, each flute 25 ordinarily comprises, on an opposite side of the first cutting edge 29 from the first surface 33, a land 45. Where a tool has multiple flutes 24, the land 45 is ordinarily disposed between the first cutting edge 29 of one flute and the second edge 31 of another flute. Each land 45 can be provided with a plurality of chip dividing grooves 47 to facilitate dividing chips machined by the cutting edge 29. The chip dividing grooves 47 can be provided on only the first portion 37 with no chip dividing grooves provided intersecting the cutting edge in the second portion 39 as it is ordinarily more useful to divide sharper chips into smaller pieces than it is to divide dull chips of more delicate material, however, chip dividing grooves can be provided on both the first and second portions of the flute, neither of the first and second portions, or one of either of the first and second portions. Thus, the chip dividers can be placed on both portions of the tool, these chip dividers will reduce forces and heat and for the metal material the chip dividers also reduce the size of the chips to facilitate chip evacuation. The negative pitch or helix angles of the tool and gravitation on the chips will cooperate to evacuate chips. An angle formed by a line (T1 or T2 in FIGS. 1B and 1A, respectively) tangent to the helix and a plane through the longitudinal axis of the tool forms the negative pitch or negative helix angle.

Figure 4A:
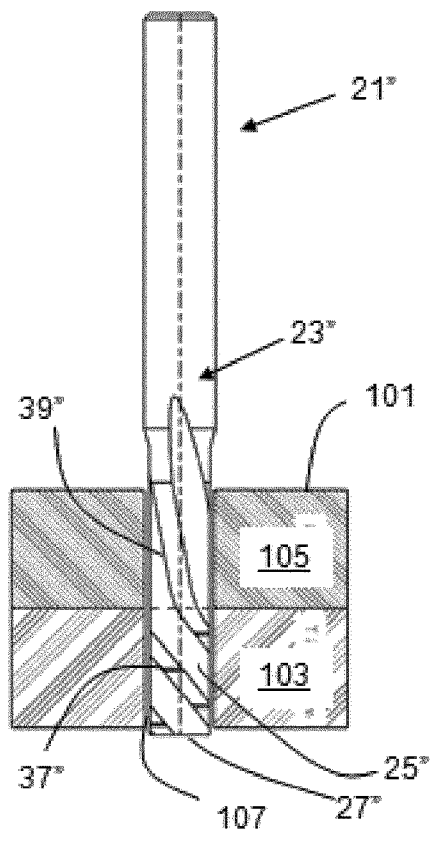
FIGS. 4A and 4B are partially cross-sectional views of a workpiece machined by tool according to a method aspect of the present invention.
Figure 4B:
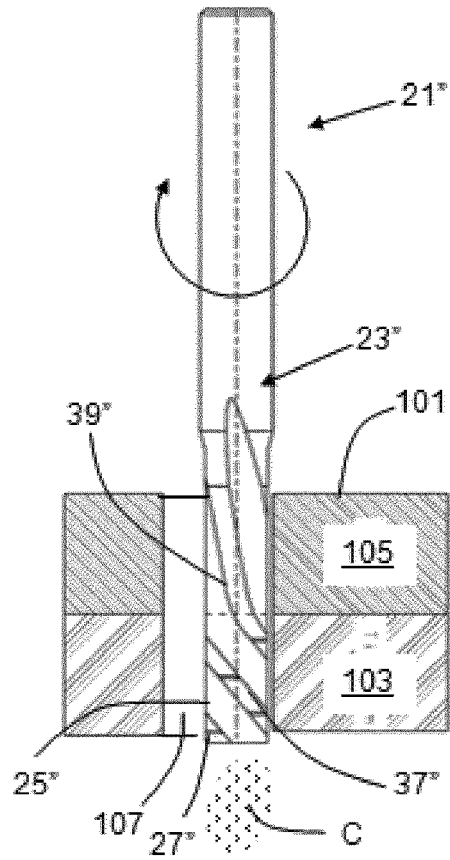

FIGS. 4A-4B illustrate a method for machining a stacked material workpiece 101 that comprises a first material 103 stacked adjacent a second material 105 of FRP, a hole 107 is formed in the workpiece. As seen in FIG. 4A, a tool 21" for machining the workpiece 101 is positioned in the hole 107. A first portion 37" of the flute 25" is disposed adjacent the first material 103 and a second portion 39" is disposed adjacent the second material 105. As seen in FIG. 4B, material is removed from the workpiece 101 by turning the tool 21" about the longitudinal axis of the tool in a clockwise machining direction to form chips from the first material 103 and the second material 105. Chips are removed from the hole 107 in a direction toward the first material 103 and away from the second material 105. The illustrated tool 21" is left handed and rotated in a clockwise cutting or machining direction. It will be appreciated that the first portion 37" of the flute 25" may have a larger negative pitch angle than that of the second portion 39", and that chip dividers may be provided only either one or both of the first portion and the second portion, depending upon the optimal cutting edge configurations for the workpiece. Chips formed from the first material 103 may be broken with chip dividers 47" intersecting the cutting edge of the first portion 37" of each helical flute 25". Similar chip dividers (not shown) may be provided along the second portion 39" for dividing chips from the second material 105 although usually not favorable. The tool 21" can be positioned in the hole 107 so that the forward end 27" of the tool extends beyond a surface of the workpiece 101 (as in the embodiments illustrated in FIGS. 2B and 4A-4B) or the forward end of the tool may be disposed in the workpiece (as in the embodiment shown in FIG. 2A), such as when it is desired to machine the hole only to a particular depth.

While the illustrated tools 21 and 21" define a circularly cylindrical profile when rotated about their longitudinal axes, it will be appreciated that tools having non-cylindrical profiles when rotated about their longitudinal axes may be provided, as well. Such tools may be useful when it is desired to machine an opening having non-cylindrical walls or grooves in or protrusions on cylindrical or non-cylindrical walls.

Thus, the present invention provides a tool and method for machining a stacked material that can provide optimal machining characteristics for the respective materials of the stacked material and that reduces the potential for damage to the FRP as the result of removing sharp chips of the other material.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 14156528.3, from which this application claims priority, are incorporated herein by reference.

The invention claimed is:

1. A tool for a stacked material workpiece, the workpiece including a first material stacked adjacent a second material, said tool comprising:
    a tool body having a forward end; and
    one or more helical flutes disposed on the tool body and extending to the forward end, each helical flute having a width defined by a first cutting edge and a second edge, a first surface of the flute adjacent the first cutting edge facing the forward end of the tool body and a second surface of the flute adjacent the second edge facing away from the forward end of the tool body and in that the tool has only negative pitch angles, wherein each helical flute includes a first portion having a first negative pitch angle and a second portion having a second negative pitch angle different from the first negative pitch angle, the first portion extending from the forward end of the tool body to the second portion, wherein the first negative pitch angle is greater than the second negative pitch angle, the first negative pitch angle being in the range of 35 to 45° and the second negative pitch angle being in the range of 5 to 15° relative to a longitudinal axis of the tool, the first portion being arranged to be positioned adjacent the first material and the second portion being arranged to be positioned adjacent the second material.

2. The tool as set forth in claim 1, wherein the first portion has a first cutting edge geometry and the second portion has a second cutting edge geometry different from that of the first portion.

3. The tool as set forth in claim 2, wherein each flute includes a land on an opposite side of the first cutting edge from the first surface.

4. The tool as set forth in claim 1, wherein each flute includes a land on an opposite side of the first cutting edge from the first surface.

5. The tool as set forth in claim 4, wherein each land includes a plurality of chip dividing grooves.

6. The tool as set forth in claim 5, wherein no chip dividing grooves are provided in each land intersecting the cutting edge in the second portion of each helical flute.

7. The tool as set forth in claim 4, wherein each land includes at least one chip dividing groove intersecting the cutting edge of the first portion of each helical flute.

8. The tool as set forth in claim 1, wherein the forward end of the tool body is perpendicular to a longitudinal axis of the tool or provided with radially extending cutting edges.

9. The tool as set forth in claim 1, wherein the first negative pitch angle is 40° and the second negative pitch angle is 10°.

10. The tool as set forth in claim 1, wherein the tool is arranged to perform a machining operation when rotated in a clockwise direction about a longitudinal axis of the tool and the helical flute is left-handed.

11. The tool as set forth in claim 1, wherein the first and second negative pitch angles are constant along its respective portion.

12. A method for machining a stacked material workpiece, the workpiece including a first material stacked adjacent a second material, the method comprising:
    forming a hole in the workpiece;
    positioning a tool for machining the workpiece in the hole, the tool having a tool body including one or more helical flutes extending to a forward end of the tool body;
    removing material from the workpiece by turning the tool about a longitudinal axis of the tool in a machining direction to form chips from the first material and the second material; and
    removing chips from the hole via the one or more flutes in a direction toward the first material and away from the second material, wherein each helical flute includes a first portion having a first negative pitch angle and a second portion having a second negative pitch angle different from the first negative pitch angle, wherein the first negative pitch angle is greater than the second negative pitch angle, the first negative pitch angle being in the range of 35 to 45° and the second negative pitch angle being in the range of 5 to 15° relative to a longitudinal axis of the tool, the method further comprising positioning the first portion adjacent the first material and the second portion adjacent the second material.

13. The method as set forth in claim 12, wherein the first portion has a first cutting edge geometry and the second portion has a second cutting edge geometry different from the first cutting edge geometry.

14. The method as set forth in claim 12, further comprising positioning the tool in the hole so that at least one of the first portion and the second portion extends beyond a surface of the workpiece.

* * * * *